(12) United States Patent
Zhu et al.

(10) Patent No.: US 10,451,820 B1
(45) Date of Patent: Oct. 22, 2019

(54) ASSEMBLING JIG FOR OPTICAL-FIBER CONNECTOR

(71) Applicant: Amphenol Fiber Optic Technology (Shenzhen) Co., Ltd., Shenzhen, Guangdong Province (CN)

(72) Inventors: Linghua Zhu, Shenzhen (CN); Songsheng Li, Shenzhen (CN); Xing-Fu Mo, Shenzhen (CN); Jinan Zhou, Shenzhen (CN); David Frey, Shenzhen (CN); Anh Nguyen, Shenzhen (CN)

(73) Assignee: AMPHENOL FIBER OPTIC TECHNOLOGY (SHENZHEN) CO., LTD., Shenzhen, Guangdong Province (CN)

( * ) Notice: Subject to any disclaimer, the term of this patent is extended or adjusted under 35 U.S.C. 154(b) by 0 days.

(21) Appl. No.: 16/139,833

(22) Filed: Sep. 24, 2018

(30) Foreign Application Priority Data

May 31, 2018 (TW) .............................. 107207185 U

(51) Int. Cl.
*G02B 6/38* (2006.01)
(52) U.S. Cl.
CPC ......... *G02B 6/3898* (2013.01); *G02B 6/3843* (2013.01)
(58) Field of Classification Search
CPC ............................ G02B 6/3843; G02B 6/3898
See application file for complete search history.

(56) References Cited

U.S. PATENT DOCUMENTS

| | | | | |
|---|---|---|---|---|
| 6,264,374 B1 * | 7/2001 | Selfridge | ............. | G02B 6/3825 385/60 |
| 6,729,773 B1 * | 5/2004 | Finona | ................. | G02B 6/3887 385/86 |
| 7,467,896 B2 * | 12/2008 | Melton | ................ | G02B 6/3849 385/78 |
| 8,256,970 B2 * | 9/2012 | Marrs | ................... | G02B 6/3802 385/55 |
| 9,081,151 B2 * | 7/2015 | Chen | .................... | G02B 6/3878 |
| 9,081,153 B2 * | 7/2015 | Li | ............................ | G02B 6/36 |
| 2016/0025939 A1 * | 1/2016 | Wei | ...................... | G02B 6/3858 385/69 |

* cited by examiner

*Primary Examiner* — Rhonda S Peace
(74) *Attorney, Agent, or Firm* — Muncy, Geissler, Olds & Lowe, P.C.

(57) ABSTRACT

An assembling jig for an optical-fiber connector includes two sleeve halves inter-connectible to form a sleeve body. Each of the sleeve halves includes a front half section, a rear half section extending rearwardly and longitudinally from the front half section, an abutment face extending longitudinally from the front half section to the rear half section, a strain relief sleeve holding groove opens at a front end face of the front half section and a cable passage groove opening at a rear end face of the rear half section. When the abutment faces abut with each other, the strain relief sleeve holding grooves cooperatively form a strain relief sleeve holding hole, and the cable passage grooves cooperatively form a cable passage hole.

8 Claims, 12 Drawing Sheets

ASSEMBLING JIG FOR OPTICAL-FIBER CONNECTOR

CROSS-REFERENCE TO RELATED APPLICATION

This application claims priority of Taiwanese Patent Application No. 107207185, filed on May 31, 2018.

FIELD

The disclosure relates to an assembly tool for an optical-fiber connector, and more particularly to an assembling jig for an optical-fiber connector.

BACKGROUND

Referring to FIGS. 1 and 2, a conventional optical-fiber connector 1 includes a casing 11, a strain relief sleeve 12 disposed in the casing 11 and allowing a fiber cable to extend therethrough, and a connector housing 13 that defines an insertion space 130. To assemble the optical-fiber connector 1, first, the fiber cable is inserted through the strain relief sleeve 12, followed by mounting the strain relief sleeve 12 to the casing 11, and then the casing 11 is inserted into the insertion space 130 of the connector housing 13. The assembled optical-fiber connector 1 can then be connected to an adaptor of required standards (not shown).

However, there are two main types of fiber cables used with the optical-fiber connector 1, namely round and flat fiber cables, and with each type of cable requiring different accessory components, the assembly of the optical-fiber connector 1 can become complicated. Furthermore, both the insertion of the strain relief sleeve 12 through the casing 11 and insertion of the casing 11 into the insertion space 130 of the connector housing 13 are currently done manually. With the need for more compactly packed optical fiber networks, the size of the optical-fiber connector 1 is usually small, resulting in smaller components. The smaller size of the components makes it difficult to grip the casing 11 and the strain relief sleeve 12 for assembling the optical-fiber connector 1.

SUMMARY

Therefore, this disclosure provides an assembling jig for an optical-fiber connector that can alleviate at least one of the drawbacks of the aforementioned conventional optical-fiber connector. An optical-fiber connector assembly including the assembling jig is also provided.

According to a first aspect of this disclosure, an assembling jig for an optical-fiber connector, which has a strain relief sleeve and a ferrule holder casing, includes two sleeve halves inter-connectible to form a sleeve body, and a plurality of mating elements disposed on the sleeve halves to interconnect the sleeve halves.

Each of the sleeve halves includes a front half section having a front end face transverse to a longitudinal axis of the sleeve body, a rear half section extending rearwardly from a rear end of the front half section along the longitudinal axis and having a rear end face transverse to the longitudinal axis and opposite to the front end face of the front half section, an abutment face extending along the longitudinal axis from the front half section to the rear half section and connecting and meeting the front and rear end faces, a strain relief sleeve holding groove that opens at the front end face and that is indented from the abutment face, and a cable passage groove that is indented from the abutment face and that extends rearwardly from a rear end of the strain relief sleeve holding groove and that opens at the rear end face. The rear half section has a transverse cross section larger than that of the front half section.

The mating elements are disposed on the abutment faces of the sleeve halves and matable with each other to place the abutment faces in abutment with each other.

When the abutment faces abut with each other, the strain relief sleeve holding grooves of the sleeve halves cooperatively form a strain relief sleeve holding hole configured to hold the strain relief sleeve of the optical-fiber connector, the cable passage grooves of the sleeve halves cooperatively form a cable passage hole configured to receive a fiber cable connected to the optical-fiber connector, and the rear half sections of the sleeve halves cooperatively form a grip portion configured to be gripped by a user to apply forces to the strain relief sleeve for assembly of the optical-fiber connector.

According to a second aspect of this disclosure, an optical-fiber connector assembly includes an optical-fiber connector, a fiber cable, and an assembling jig. The optical-fiber connector includes a fiber ferrule, a ferrule holder casing, and a strain relief sleeve connected to the ferrule holder casing. The fiber cable is connected to the strain relief sleeve. The assembling jig includes two sleeve halves inter-connectible to form a sleeve body, and a plurality of mating elements disposed on the sleeve halves to interconnect the sleeve halves.

Each of the sleeve halves includes a front half section having a front end face, a rear half section extending rearwardly from a rear end of the front half section and having a rear end face opposite to the front end face, an abutment face extending from the front half section to the rear half section and connecting and meeting the front and rear end faces, a strain relief sleeve holding groove that opens at the front end face and that is indented from the abutment face, and a cable passage groove that is indented from the abutment face and that extends rearwardly from a rear end of the strain relief sleeve holding groove and that opens at the rear end face. The rear half section has a transverse cross section larger than that of the front half section.

The mating elements are disposed on the abutment faces of the sleeve halves and mate with each other to place the abutment faces in abutment with each other.

The strain relief sleeve holding grooves of the sleeve halves cooperatively receive and hold the strain relief sleeve of the optical-fiber connector.

The cable passage grooves of the sleeve halves cooperatively receive the fiber cable.

The rear half sections of the sleeve halves cooperatively form a grip portion configured to be gripped by a user to apply forces to the strain relief sleeve for assembly with the fiber ferrule and the ferrule holder casing.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
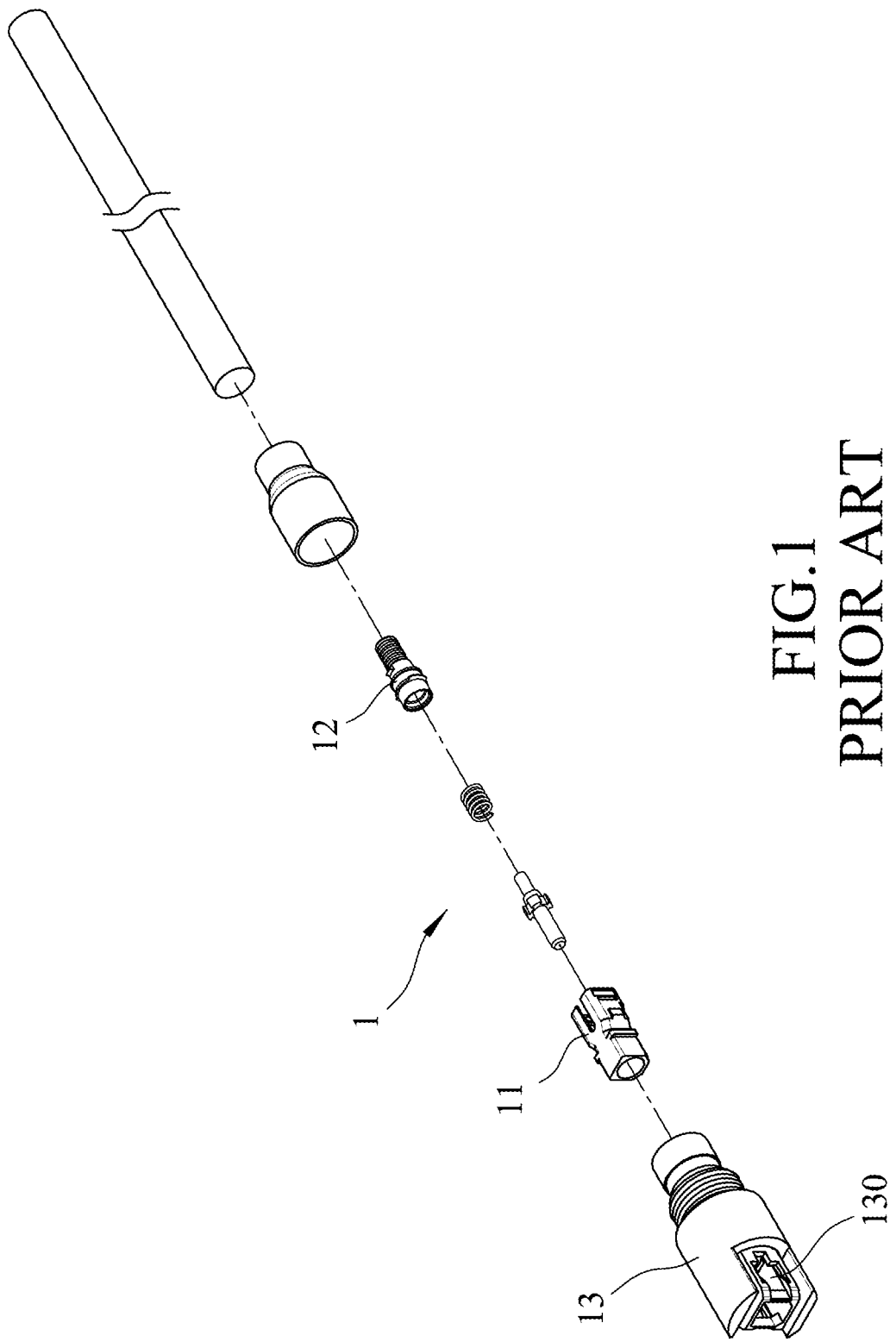
FIG. 1 is an exploded view of a conventional optic-fiber connector.
Figure 2:
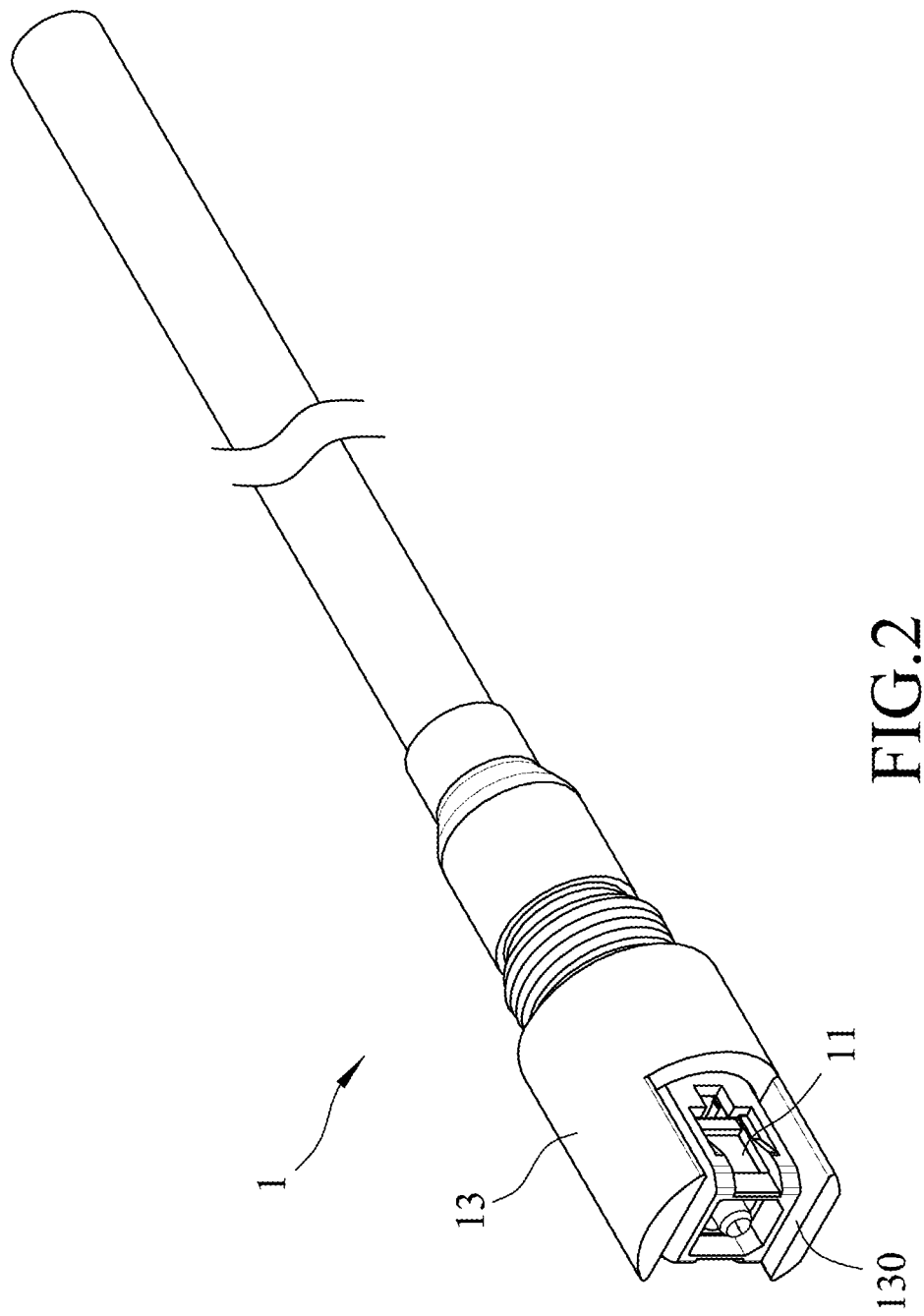
FIG. 2 is a perspective view of a conventional optic-fiber connector.
Figure 3:
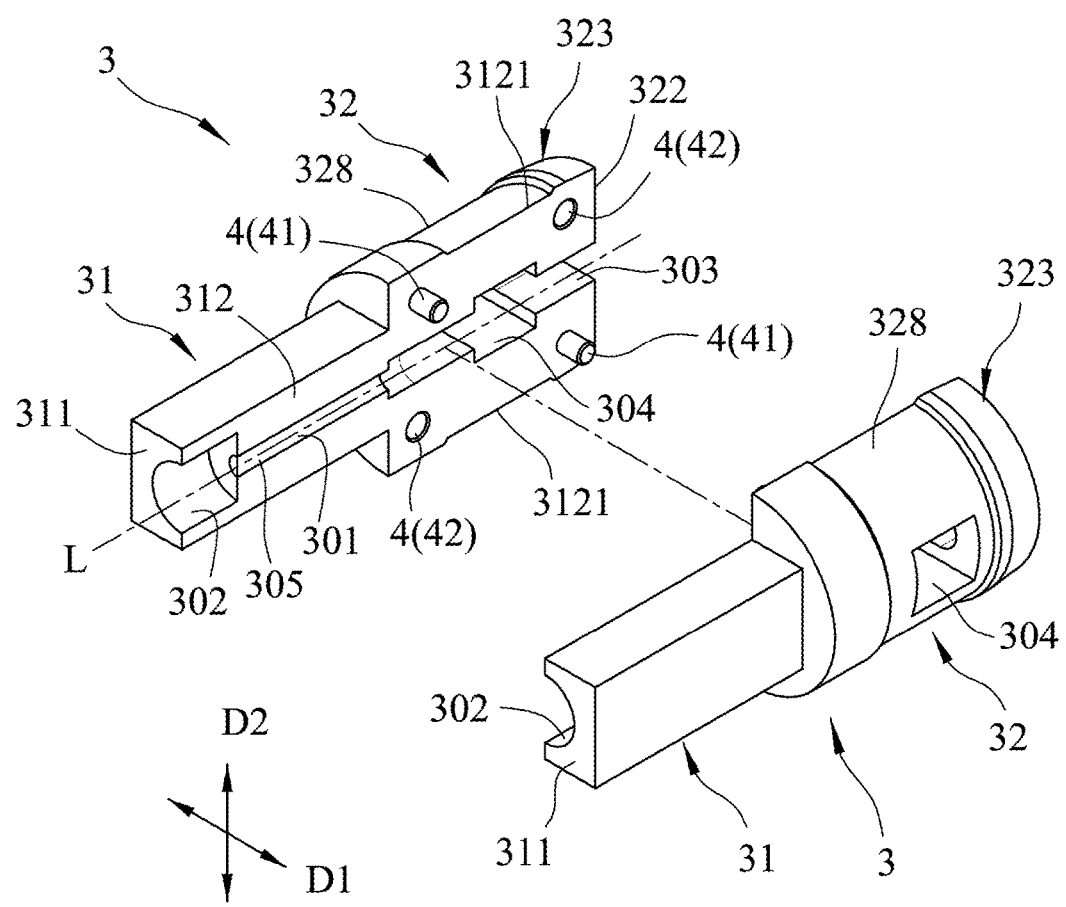
FIG. 3 is a perspective view of two sleeve halves of an embodiment of the assembling jig according to the disclosure.
Figure 6:
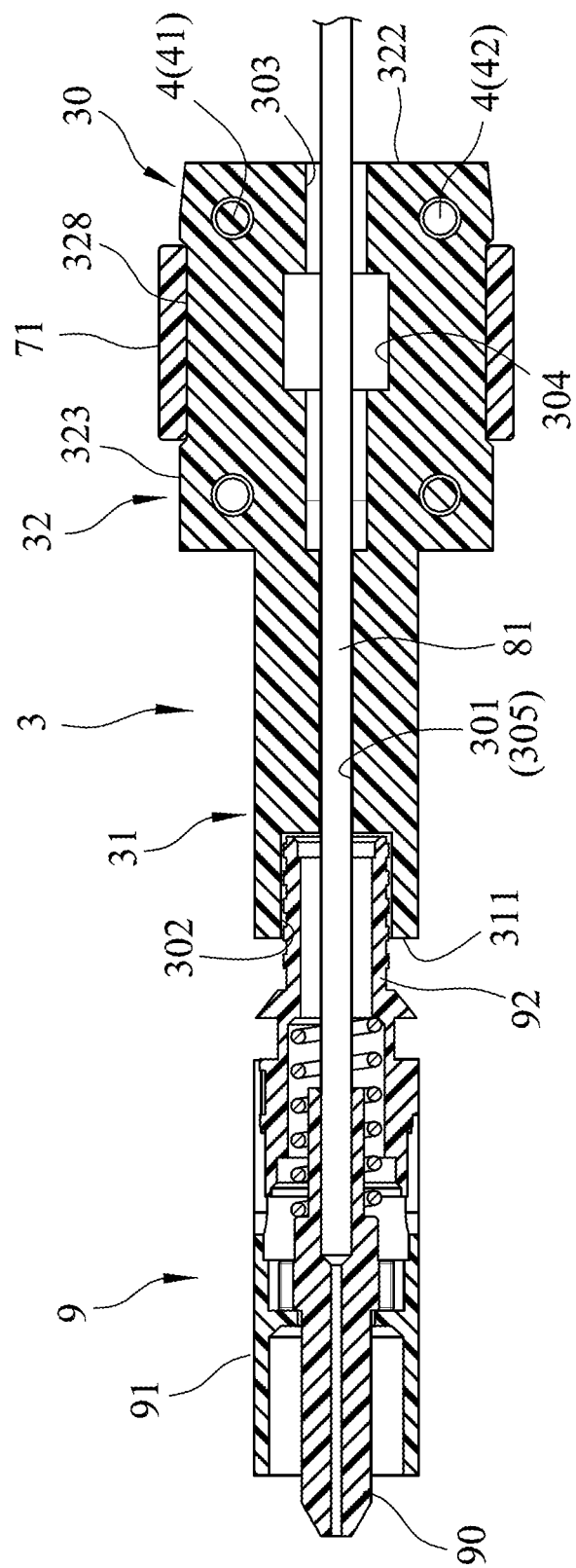
FIG. 6 is a sectional view of the embodiment illustrating how the assembling jig assembles with an optical-fiber connector when the round fiber cable is used.
Figure 9:
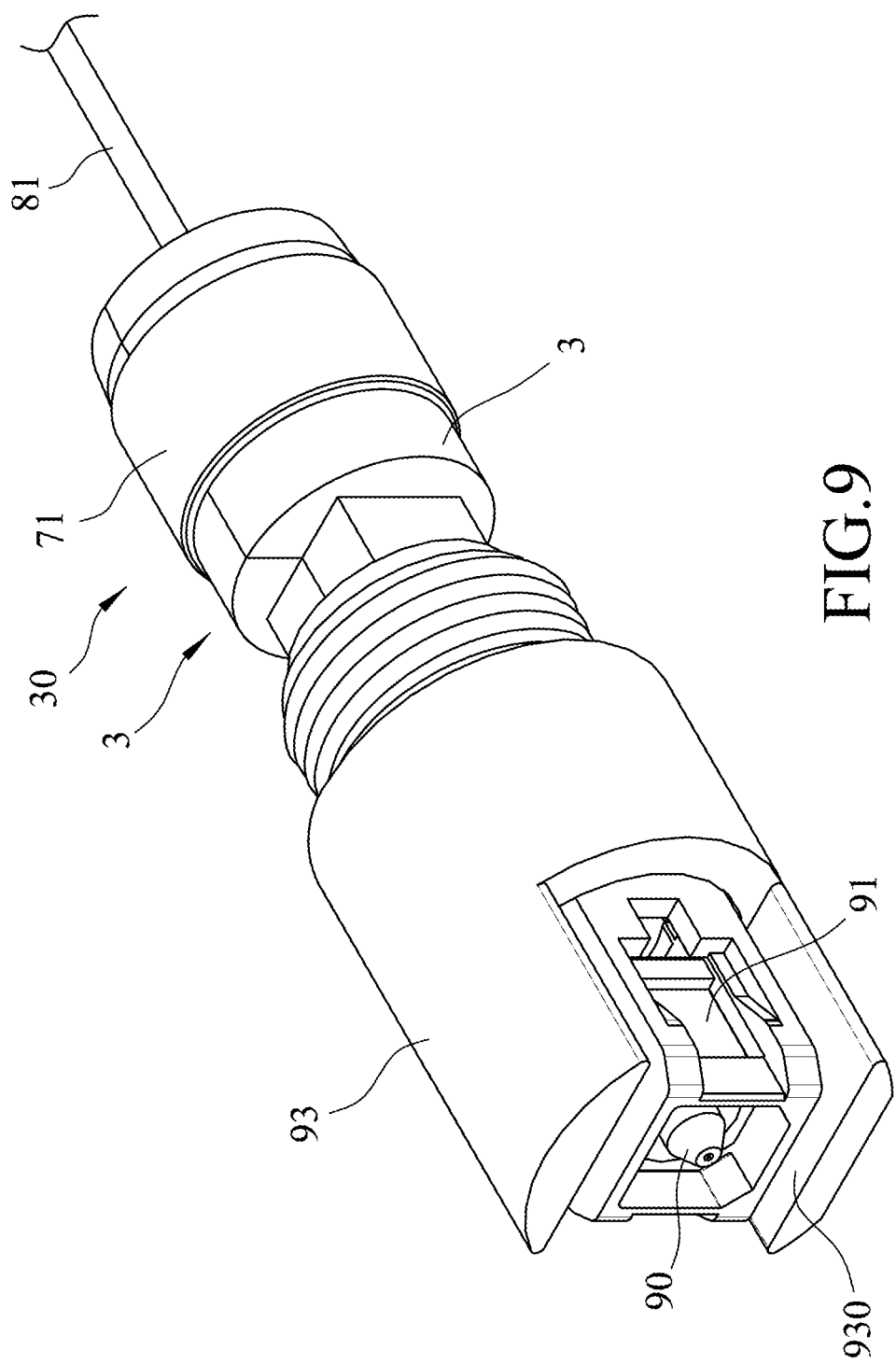
FIG. 9 is a perspective view of the embodiment showing the complete assembly of the optical-fiber connector with the round fiber cable.

Referring to FIGS. 3, 6, and 9, an embodiment of an assembling jig for an optical-fiber connector assembly of the disclosure is disclosed. The optical-fiber connector assembly includes a optical-fiber connector 9 which includes a fiber ferrule 90, a ferrule holder casing 91, a strain relief sleeve 92 connected to the ferrule holder casing 91 and allowing a fiber cable 81 to extend therethrough, and a connector housing 93 defining an insertion space 930 for the insertion of the ferrule holder casing 91 together with the fiber cable 81 therein. The assembling jig includes two sleeve halves 3 inter-connectible to form a sleeve body 30, and a plurality of mating elements 4 disposed on the sleeve halves 3 to interconnect the sleeve halves 3.

Each of the sleeve halves 3 includes a front half section 31, a rear half section 32, an abutment face 312, a strain relief sleeve holding groove 302, and a cable passage groove 301. In the following, since the sleeve halves 3 have the same structure, one of the sleeve halves 3 is used as an example to illustrate the structure of the sleeve halves 3.

The front half section 31 has a front end face 311 that is transverse to a longitudinal axis (L) of the sleeve body 30. In this embodiment, the front half section 31 is exemplified to have a tetragonal transverse cross-section.

Figure 4:
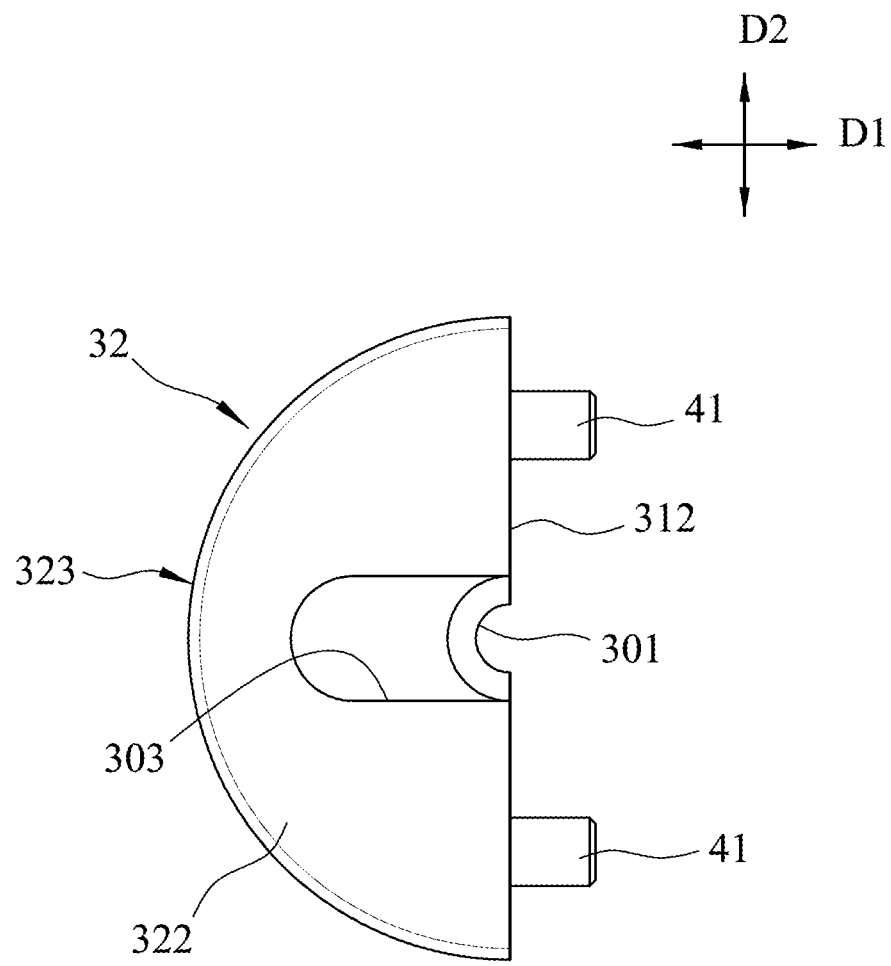
FIG. 4 is a side view of the embodiment.

Further referring to FIG. 4, the rear half section 32 extends rearwardly from a rear end of the front half section 31 along the longitudinal axis (L), and has a rear end face 322 transverse to the longitudinal axis (L) and opposite to the front end face 311 of the front half section 31. The rear half section 32 has a transverse cross-section larger than that of the front half section 311. In this embodiment, the transverse cross-section of the rear half section 32 is exemplified to be substantially semi-circular.

The abutment face 312 extends along the longitudinal axis (L) from the front half section 31 to the rear half section 32 and connects and meets the front and rear end faces 311, 322. The abutment face 312 is planar and has two diametrically opposite sides 3121.

The rear half section 32 further has an outer contoured surface 323 having two angularly spaced apart opposite ends respectively connected to the two opposite sides 3121 of the abutment face 312, an outer groove 328 indented in the outer contoured surface 323, and a tool insertion slot 304. The outer grooves 328 loops around the outer contoured surfaces 323 of the rear half sections 32 of the sleeve halves 3 when the sleeve halves 3 are interconnected. The tool insertion slot 304 intersects the rear groove section 303 and opens at the abutment surface 312 and the outer contoured surface 323. The 304 is configured to permit insertion of a tool for applying forces to the fiber cable 81.

The strain relief sleeve holding groove 302 opens at the front end face 311 and is indented from the abutment face 312.

The cable passage groove 301 is indented from the abutment face 312, extends rearwardly from a rear end of the strain relief sleeve holding groove 302, and opens at the rear end face 322. The cable passage groove 301 has a front groove section 305 formed in the front half section 31 and in communication with the strain relief sleeve holding groove 302, and a rear groove section 303 formed in the rear half section and in communication with the front groove section 305. The strain relief sleeve holding groove 302 has a cross-section larger than that of the cable passage groove 301.

The rear groove section 303 has a depth measured from the abutment face 312 along a first direction (D1) perpendicular to the longitudinal axis (L). The depth of the rear groove section 303 is larger than that of the front groove section 305. Besides, the rear groove section 303 has a width measured along a second direction (D2) perpendicular to both the first direction (D1) and the longitudinal axis (L). The depth of the rear groove section 303 is larger than the width of the rear groove section 303.

Regarding interconnection between the sleeve halves 3, the mating elements 4 are disposed on the abutment faces 312 of the sleeve halves 3, and include at least one male element 41 disposed on the abutment face 312 of one of the sleeve halves 3, and at least one female element 42 engageable with the at least one male element 41 and disposed on the abutment face 312 of the other one of the sleeve halves 3.

The mating elements 4 are matable with each other to place the abutment faces 312 in abutment with each other. It should be noted that the mating elements 4 may be any mechanism that allows the two sleeve halves 3 to be connected, such as a mortise-and-tenon joint.

When the abutment faces 312 abut with each other, the strain relief sleeve holding grooves 302 of the sleeve halves 3 cooperatively form a strain relief sleeve holding hole configured to hold the strain relief sleeve 92 of the optical-fiber connector 9, the cable passage grooves 301 of the sleeve halves 3 cooperatively form a cable passage hole configured to receive the fiber cable, and the rear half sections 32 of the sleeve halves 3 cooperatively form a grip portion configured to be gripped by a user to apply forces to the strain relief sleeve 92 for assembly of the optical-fiber connector 9. In other words, the strain relief sleeve holding grooves 302 of the sleeve halves 3 cooperatively receive and hold the strain relief sleeve 92 of the optical-fiber connector 9, and the cable passage grooves 301 of the sleeve halves 3 cooperatively receive the fiber cable 81, and the grip portion formed by the rear half sections 32 of the sleeve halves 3 facilitates assembly with the fiber ferrule 90 and the ferrule holder casing 91.

This embodiment may be used with the fiber cables 81 of conventional specifications. The following are descriptions in regards to the application of the embodiment with different types of the fiber cables 81.

Figure 5:
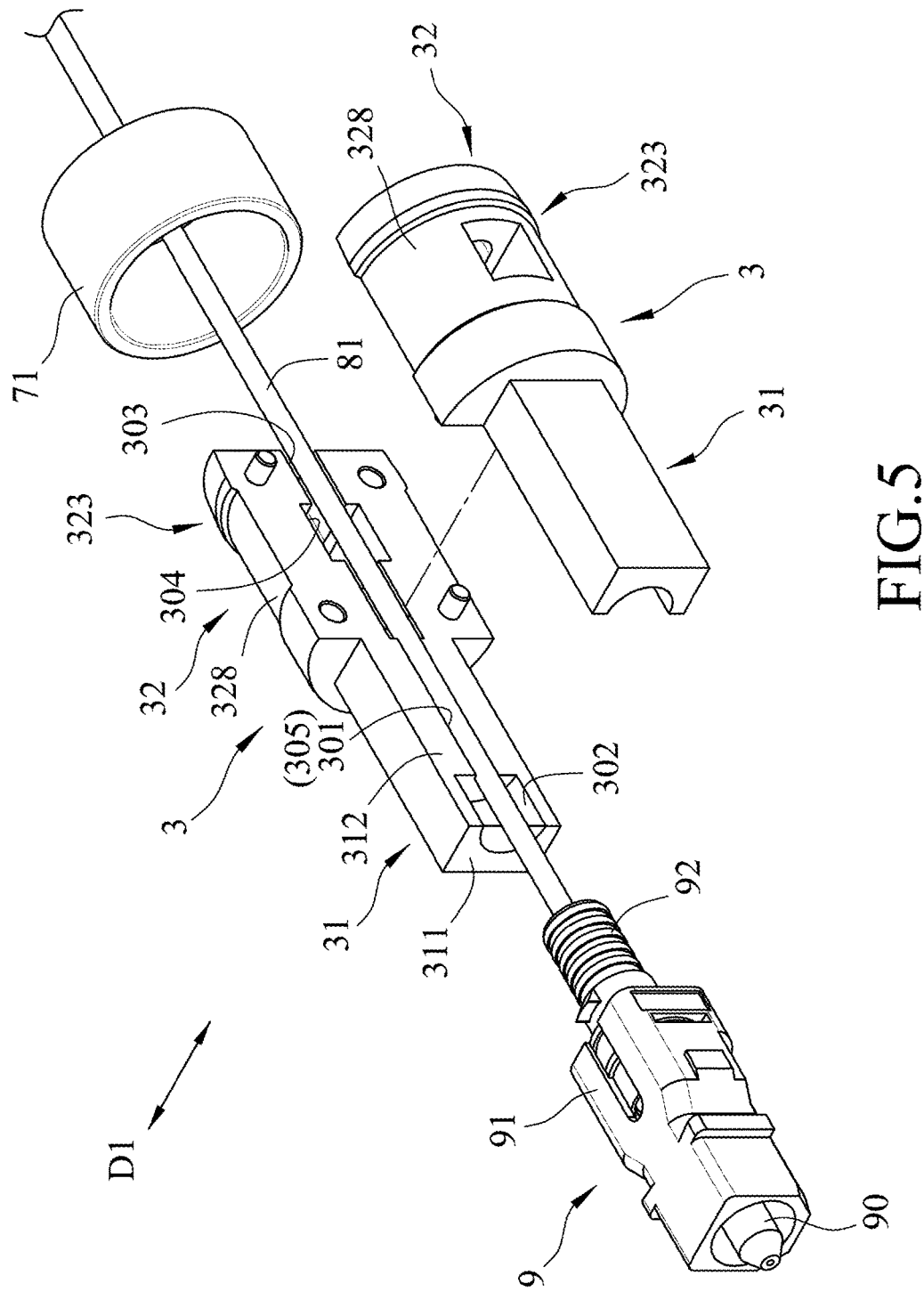
FIG. 5 is an exploded perspective view of the embodiment being used with a round fiber cable.
Figure 7:
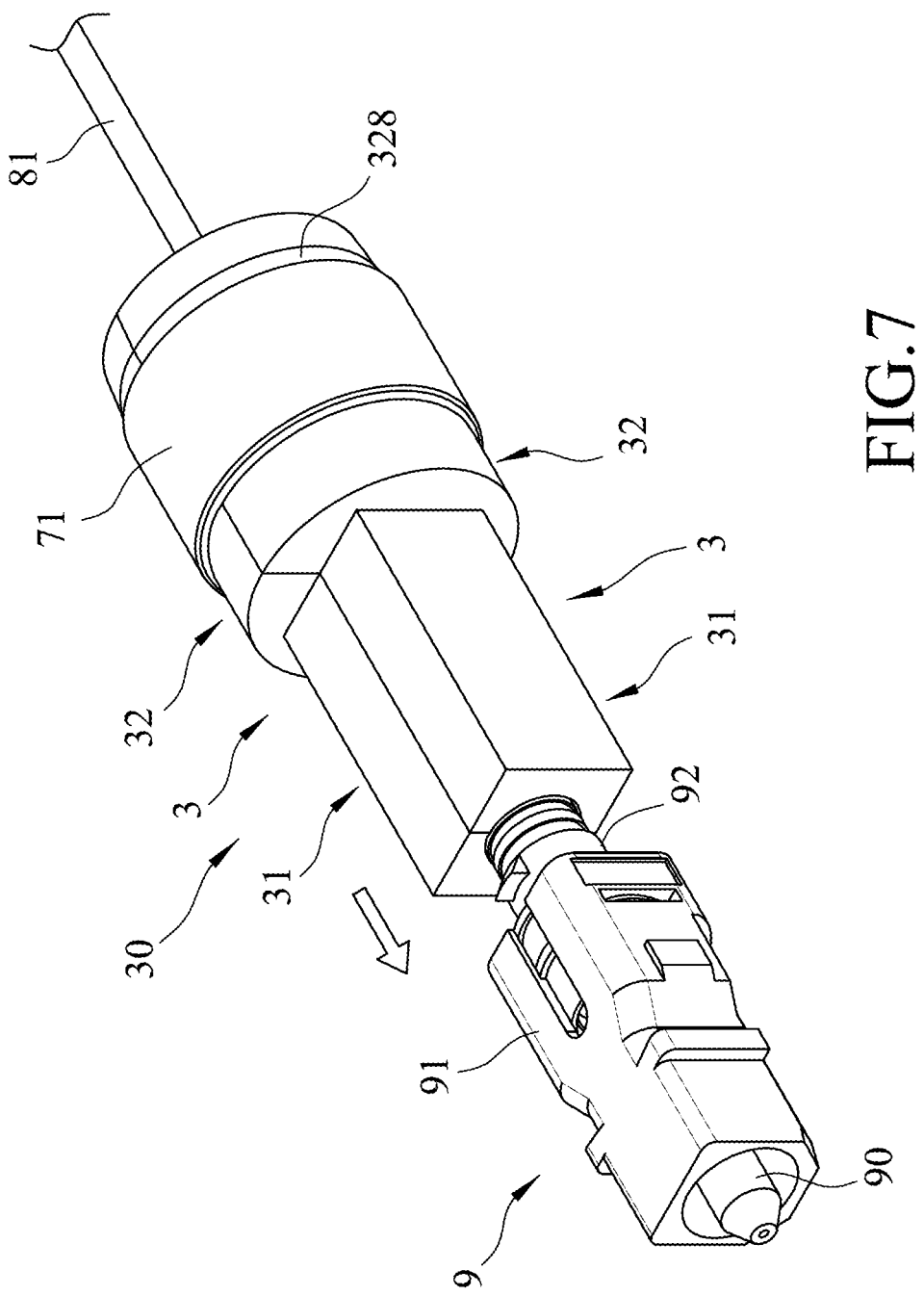
FIG. 7 is a perspective view of the embodiment illustrating how the assembling jig helps the assembly of the optical-fiber connector when the round fiber cable is used.

Referring to FIG. 5, the embodiment may be used with the fiber cable 81 which is a round fiber cable. The assembly of the optical-fiber connector 9 with the assembling jig starts with inserting the round fiber cable 81 through the strain relief sleeve 92 and into the ferrule 90, then disposing the strain relief sleeve 92 within the strain relief sleeve holding groove 302 of one of the sleeve halves 3 as shown in FIG. 6. Accordingly, the round fiber cable 81 can be received in the cable passage groove 301 of the same sleeve half 3. Then, the two sleeve halves 3 are interconnected using the mating members 4 as shown in FIG. 7. The assembling jig may further include an outer metal ring 71 that is received in the outer grooves 328 to sleeve around the rear half sections 32 of the sleeve halves 3. By applying force to the outer metal ring 71 after the outer metal ring 71 is received in the outer grooves 328, the outer metal ring 71 would further tighten and secure the two sleeve halves 3 interconnected together, and further secure the strain relief sleeve 92 and the round fiber cable 81 within the sleeve body 30.

Figure 8:
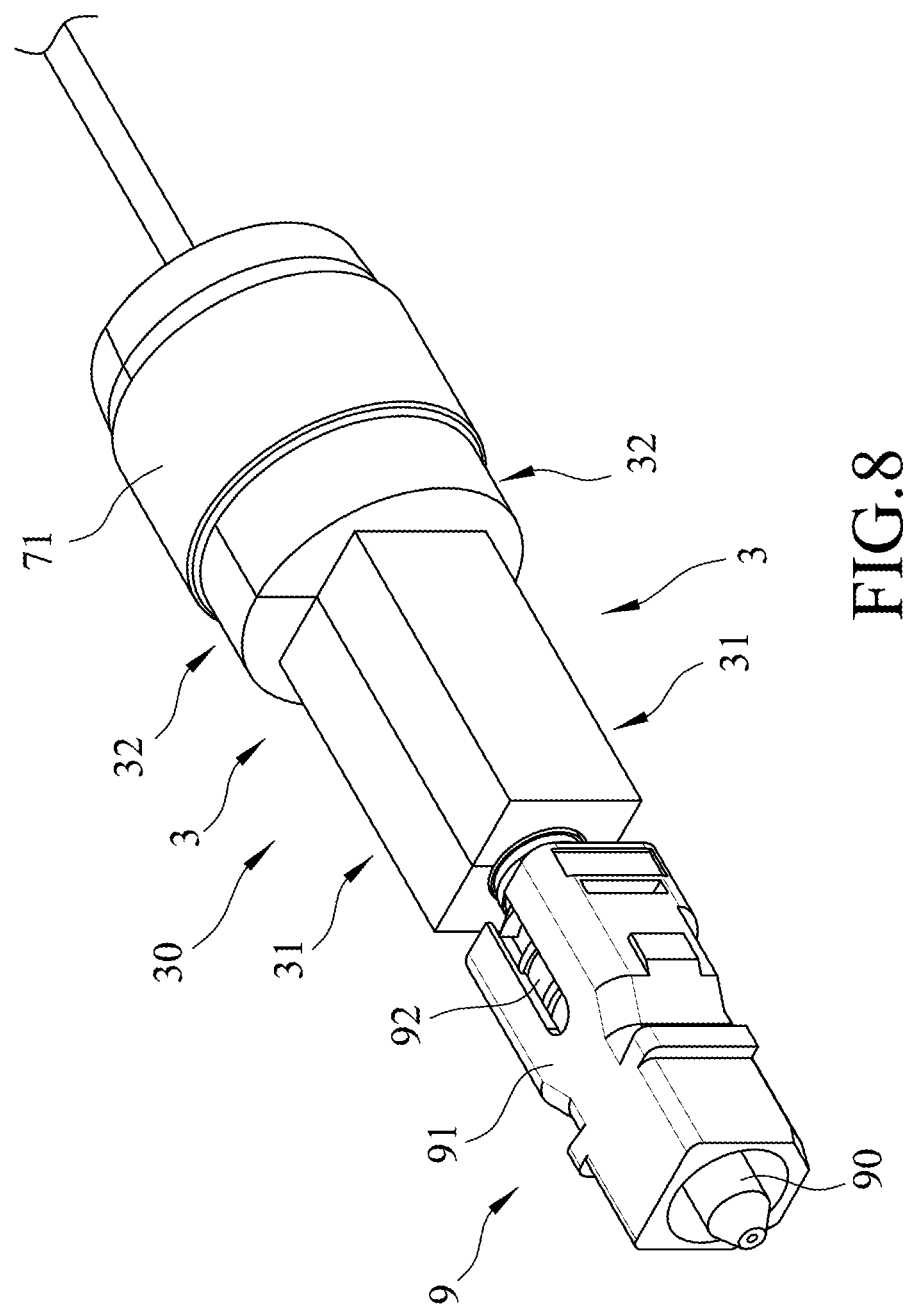
FIG. 8 is another perspective view of the embodiment illustrating how the assembling jig helps the assembly of the optical-fiber connector when the round fiber cable is used.

Referring to FIGS. 7 to 9, since the rear half section 32 of each of the two sleeve halves 3 has a larger cross-section transverse to the longitudinal axis (L) than the front half section 31, by gripping and applying force through the grip portion of the sleeve body 30 of the two sleeve halves 3 interconnected together, the ferrule 90 and the strain relief sleeve 92 can be easily inserted through the ferrule holder casing 91, then inserted with the ferrule holder casing 91 into the connector housing 93, completing the assembly of the optical-fiber connector 9 in one action.

Figure 10:
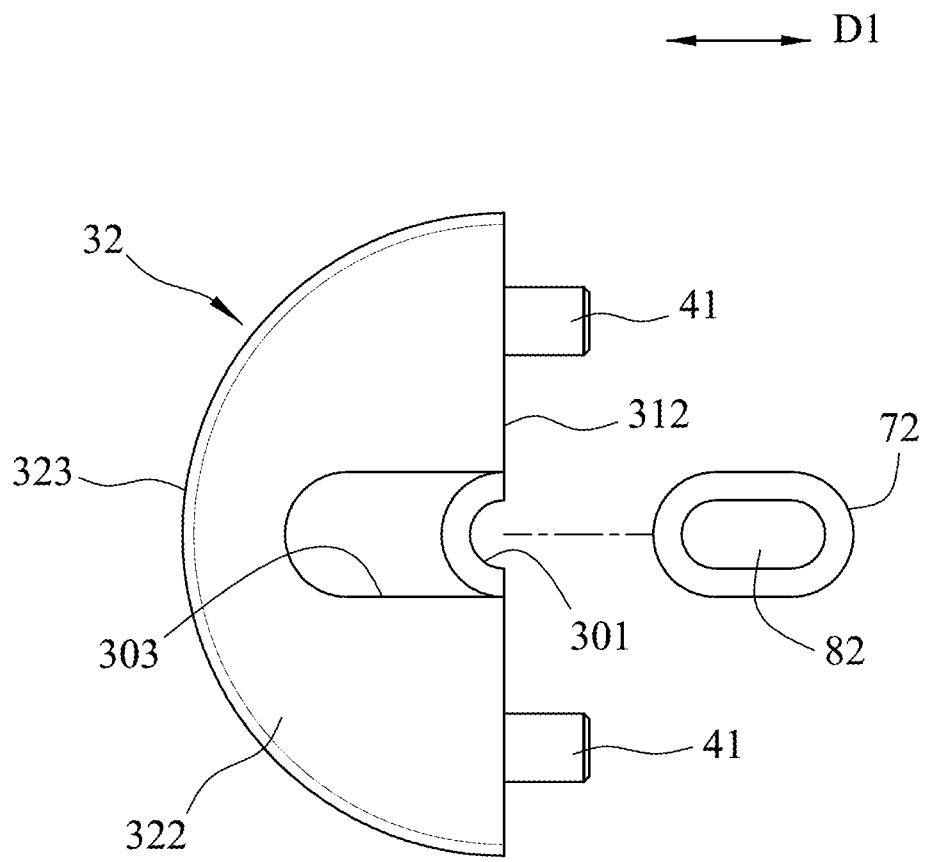
FIG. 10 is a side view of the embodiment illustrating how the embodiment is used with a flat fiber cable.
Figure 11:
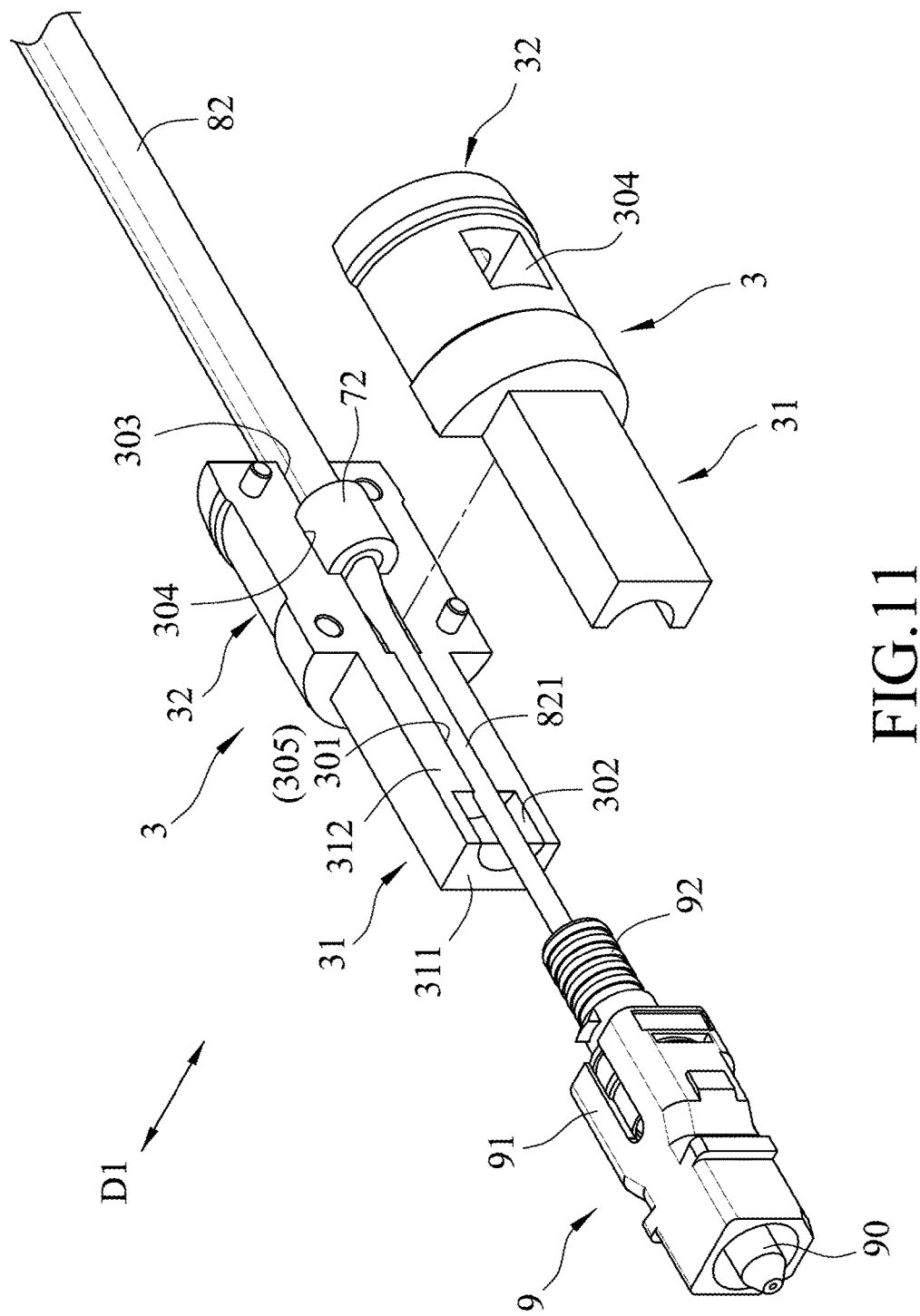
FIG. 11 is a partly exploded perspective view of the embodiment illustrating how the assembly jig helps the assembly of the optical-fiber connector when the flat fiber cable is used.
Figure 12:
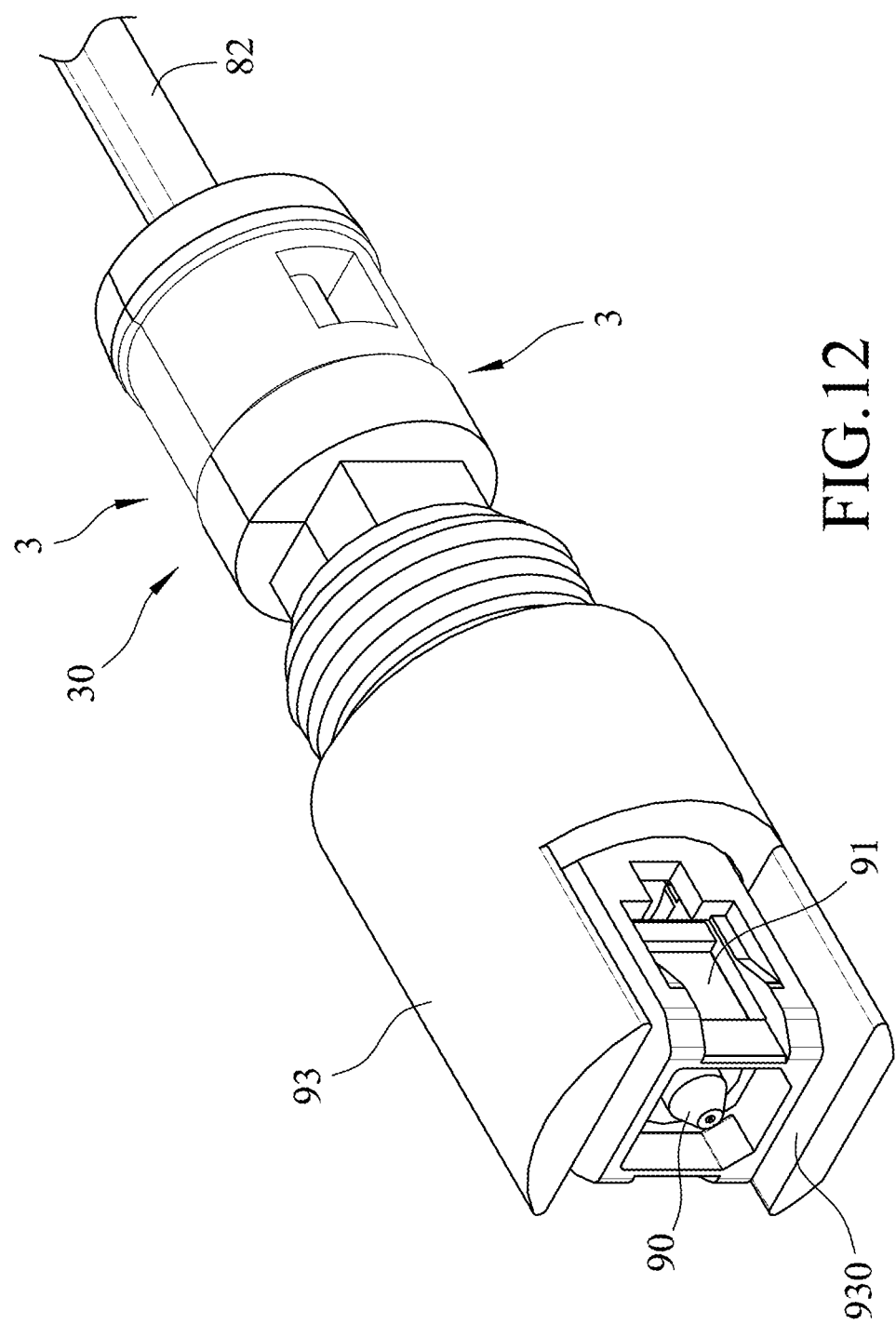
FIG. 12 is a perspective view of the embodiment, illustrating the complete assembly of the optical-fiber connector with the flat fiber cable.

Referring to FIGS. 10 to 12, in another example, the round fiber cable 81 is replaced with a flat fiber cable 82. The assembling jig may further include the inner metal ring 72 that is configured to wrap around a flat fiber cable 82. After the flat fiber cable 82 is inserted through the strain relief sleeve 92 and into the ferrule 90, the inner metal ring 72 is wrapped around the flat fiber cable 82. The flat fiber cable 82 can then be disposed into the cable receiving groove 301. The inner metal ring 72 is received in the rear groove section 303 of the cable passage groove 301, and a main cable part 821 of the front section of the flat fiber cable 82 extend through the front groove section 305 of the cable receiving groove 301. Then, the two sleeve halves 3 may be interconnected to dispose the flat fiber cable 82 and the inner ring 72 within the sleeve body 30, and to receive the strain relief sleeve 92 within the strain relief sleeve holding hole. The inner metal ring 72 is received in a space where the rear groove sections 303 of the half sleeves 3 respectively intersect the tool insertion slots 304 of the sleeve halves 3, such that the tool for applying forces to the flat fiber cable 82 may be inserted into the tool insertion slots 304 to apply force on the inner metal ring 72, further securing the position of the flat fiber cable 82. Finally, once the ferrule 90, the round fiber cable 81 and the strain relief sleeve 92 are all disposed in correct positions, the optical-fiber connector 9 may be assembled in one action, similar to the previous example with the round fiber cable 81.

In sum, the embodiment of the assembling jig according to this disclosure is configured to work with either the round fiber cables 81 or the flat fiber cables 82, and respectively with the outer metal ring 71 or the inner metal ring 72 of required specification, such that after the two sleeve halves 3 are connected and the position of the cable is secured, the assembly of the optical-fiber connector 9 may be completed in a single action and in a straightforward manner.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. An assembling jig for an optical-fiber connector that has a strain relief sleeve and a ferrule holder casing, comprising:

two sleeve halves inter-connectible to form a sleeve body, and a plurality of mating elements disposed on said sleeve halves to interconnect said sleeve halves;

each of said sleeve halves including a front half section having a front end face transverse to a longitudinal axis of said sleeve body, a rear half section extending rearwardly from a rear end of said front half section along the longitudinal axis and having a rear end face transverse to the longitudinal axis and opposite to said front end face of said front half section, an abutment face extending along the longitudinal axis from said front half section to said rear half section and connecting and meeting said front and rear end faces, a strain relief sleeve holding groove that opens at said front end face and that is indented from said abutment face, and a cable passage groove that is indented from said abutment face and that extends rearwardly from a rear end of said strain relief sleeve holding groove and that opens at said rear end face;

said rear half section having a transverse cross section larger than that of said front half section; and said mating elements being disposed on said abutment faces of said sleeve halves and matable with each other to place said abutment faces in abutment with each other, wherein, when said abutment faces abut with each other, said strain relief sleeve holding grooves of said sleeve halves cooperatively form a strain relief sleeve holding hole configured to hold the strain relief sleeve of the optical-fiber connector, said cable passage grooves of said sleeve halves cooperatively form a cable passage hole configured to receive a fiber cable connected to the optical-fiber connector, and said rear half sections of said sleeve halves cooperatively form a grip portion configured to be gripped by a user to apply forces to the strain relief sleeve for assembly of the optical-fiber connector;

wherein said cable passage groove of each of said sleeve halves has a front groove section that is formed in said front half section and in communication with said strain relief sleeve holding groove, and a rear groove section that is formed in said rear half section and in communication with said front groove section, said rear groove section having a depth measured from said abutment face along a first direction perpendicular to the longitudinal axis, the depth of said rear groove section being larger than that of said front groove section;

wherein said rear groove section has a width measured along a second direction perpendicular to both the first direction and the longitudinal axis, the depth of said rear groove section being larger than the width of said rear groove section; and wherein said abutment face is planar and has two diametrically opposite sides, said rear half section of each of said sleeve halves further having an outer contoured surface having two angularly spaced apart opposite ends respectively connected to said two opposite sides of said abutment face, and a tool insertion slot intersecting said rear groove section and opening at said abutment face and said outer contoured surface, said tool insertion slot being configured to permit insertion of a tool for applying forces to the fiber cable.

2. The assembling jig of claim 1, wherein said mating elements include at least one male element disposed on said abutment face of one of said sleeve halves, and at least one female element engageable with said at least one male element and disposed on said abutment face of the other one of said sleeve halves.

3. The assembling jig of claim 1, wherein said rear half section of each of said sleeve halves further has an outer groove indented in said outer contoured surface, said outer grooves of said sleeve halves looping around said outer contoured surfaces of said rear half sections of said sleeve halves when said sleeve halves are interconnected.

4. The assembling jig of claim 3, further comprising an outer metal ring that is received in said outer grooves to sleeve around said rear half sections of said sleeve halves.

5. The assembling jig of claim 1, wherein said tool insertion slot has a tetragonal cross-section.

6. The assembling jig of claim 1, further comprising an inner metal ring that is configured to wrap around a flat fiber cable and that is able to be received in a space where said tool insertion slots of said sleeve halves respectively intersect said rear groove sections of said half sleeves.

7. The assembling jig of claim 1, wherein said strain relief sleeve holding groove has a cross-section larger than that of said cable passage groove.

8. An optical-fiber connector assembly, comprising:
an optical-fiber connector including a fiber ferrule, a ferrule holder casing, and a strain relief sleeve connected to said ferrule holder casing;
a fiber cable connected to said strain relief sleeve; and
an assembling jig including:
two sleeve halves inter-connectible to form a sleeve body, and a plurality of mating elements disposed on said sleeve halves to interconnect said sleeve halves;
each of said sleeve halves including a front half section having a front end face transverse to a longitudinal axis of said sleeve body, a rear half section extending rearwardly from a rear end of said front half section along the longitudinal axis and having a rear end face transverse to the longitudinal axis and opposite to said front end face of the front half section, an abutment face extending along the longitudinal axis from said front half section to said rear half section and connecting and meeting said front and rear end faces, a strain relief sleeve holding groove that opens at said front end face and that is indented from said abutment face, and a cable passage groove that is indented from said abutment face and that extends rearwardly from a rear end of said strain relief sleeve holding groove and that opens at said rear end face;
said rear half section having a transverse cross section larger than that of said front half section; and
said mating elements being disposed on said abutment faces of said sleeve halves and matable with each other to place said abutment faces in abutment with each other;
wherein when said abutment faces abut with each other, said strain relief sleeve holding grooves of said sleeve halves cooperatively from a strain relief sleeve holding hole for holding the strain relief sleeve of said optical-fiber connector;
said cable passage grooves of said sleeve halves cooperatively forming a cable passage hole for receiving said fiber cable;
said rear half sections of said sleeve halves cooperatively form a grip portion configured to be gripped by a user to apply forces to said strain relief sleeve for assembly with said fiber ferrule and said ferrule holder casing;
said cable passage groove of said sleeve halves has a front groove section that is formed in said front half section and in communication with said strain relief sleeve holding groove, and a rear groove section that is formed in said rear half section and in communication with said front groove section, said rear groove section having a depth measured from said abutment face along a first direction perpendicular to the longitudinal axis, the depth of said rear groove section being larger than that of said front groove section;
said rear groove section has a width measured along a second direction perpendicular to both the first direction and the longitudinal axis, the depth of said rear groove section being larger than the width of said rear groove section; and
said abutment face is planar and has two diametrically opposite sides, said rear half section of each of said sleeve halves has an outer contoured surface having two angularly spaced apart opposite ends respectively connected to said two opposite sides of said abutment face, and a tool insertion slot that intersects said rear groove section and that opens at said abutment face and said outer contoured surface, said tool insertion slot being configured to permit insertion of a tool for applying forces to said fiber cable.

* * * * *